United States Patent [19]
Fujiwara et al.

[11] Patent Number: 5,115,512
[45] Date of Patent: May 19, 1992

[54] OPTICAL WAVEGUIDE DEVICE AND METHOD OF MAKING THE SAME

[75] Inventors: Takumi Fujiwara; Hiroshi Mori; Takemi Kawazoe, both of Oume, all of Japan

[73] Assignee: Sumitomo Metal Mining Co., Ltd., Tokyo, Japan

[21] Appl. No.: 592,976

[22] Filed: Oct. 4, 1990

[30] Foreign Application Priority Data

Oct. 6, 1989 [JP] Japan .................. 1-259936

[51] Int. Cl.$^5$ .............................................. G02B 6/12
[52] U.S. Cl. ...................................... 385/14; 385/146
[58] Field of Search ......................... 350/96.11–96.14; 385/1, 2, 4, 5, 6, 7, 8, 9, 10, 14, 129–132

[56] References Cited

U.S. PATENT DOCUMENTS

| | | | |
|---|---|---|---|
| 4,691,984 | 9/1987 | Thaniyavarn | 350/96.14 |
| 4,701,008 | 10/1987 | Richard et al. | 350/96.12 |
| 4,761,049 | 8/1988 | Barns et al. | 350/96.14 |
| 4,917,449 | 4/1990 | Granestrand | 350/96.14 |

OTHER PUBLICATIONS

R. A. Becker and R. C. Williamson, "Photorefractive effects in LiNbO$_3$ channel waveguides: Model and experimental verification", Appl. Phys. Lett. 47(10), Nov. 15, 1985, pp. 1024–1026.

D. A. Bryan, Robert Gerson, H. E. Tomaschke, "Increased optical damage resistance in lithium niobate", Appl. Phys. Lett., 44(9), May 1, 1984, pp. 847–849.

R. A. Becker, "Methods of characterizing photorefractive susceptibility of LiNbO$_3$", Integrated Optical Circuit Engineering, SPIE vol. 578 (1985).

*Primary Examiner*—Frank Gonzalez
*Assistant Examiner*—John Ngo
*Attorney, Agent, or Firm*—Graham & James

[57] ABSTRACT

The optical waveguide device comprises an optical waveguide formed as a region having a high index of refraction on a surface or in an interior including the surface of a base plate made of a ferroelectric crystal, and a film covering the surface of said optical waveguide in the direction along the c axis of said crystal phase plate and having electrical conductance higher than that of the optical waveguide. The optical waveguide is formed by thermal diffusion or a chemical reaction. This optical waveguide device is affected little by the optical damage and can be manufactured easily.

8 Claims, 3 Drawing Sheets

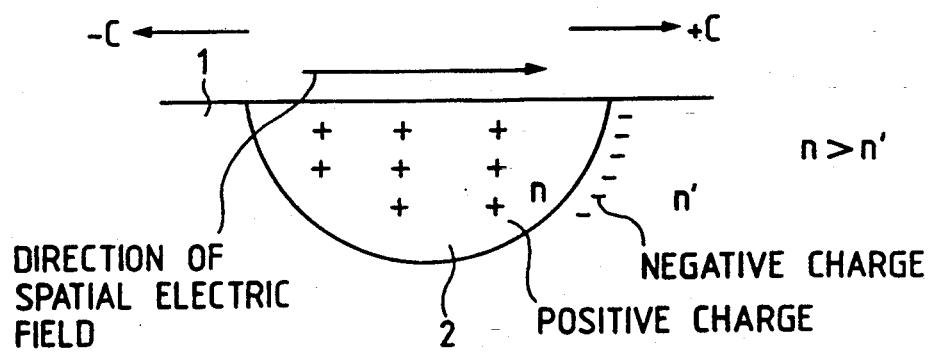
FIG. 1 PRIOR ART
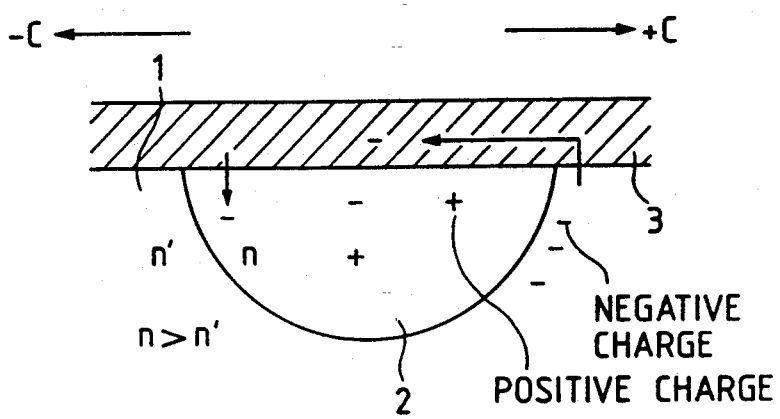
FIG. 2
FIG. 3
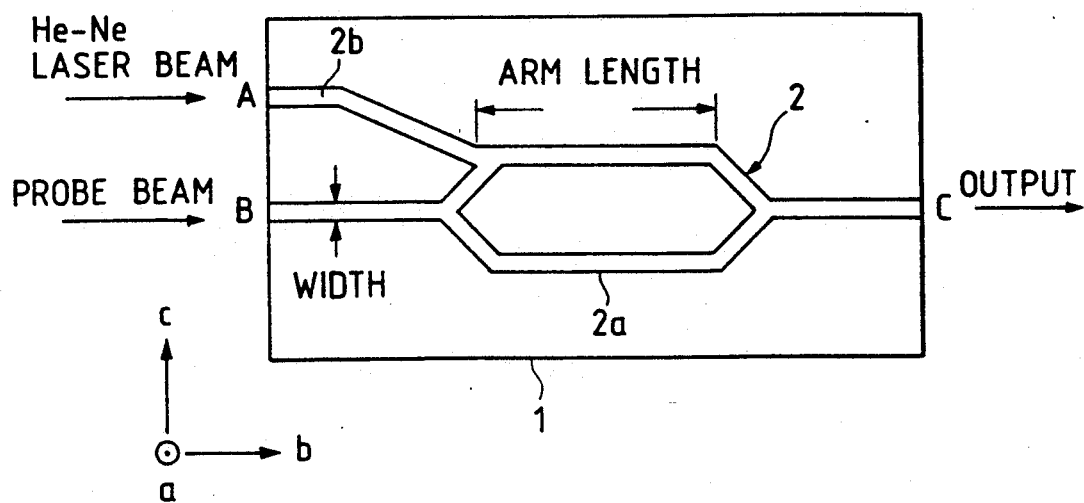

1

OPTICAL WAVEGUIDE DEVICE AND METHOD OF MAKING THE SAME

BACKGROUND OF THE INVENTION a) Field of the invention:

The present invention relates to an optical waveguide device and method of making the same which are to be used in the fields of optical communication, optical information processing and so on.

b) Descripruion of the prior art:

Since ferroelectric crystals such as LiNbO$_3$, LiTaO$_3$ and KTiOPO$_4$ exhibit remarkable electrooptical effects, accoustooptical effects and non-linear effects, there have been developed devices for controlling light with optical waveguides formed on base plates made of these crystals. The optical waveguide device using the LiNbO$_3$ crystal is studied most widely. However, the optical waveguide formed on a base plate made of the LiNbO$_3$ crystal produces, like the optical waveguide formed on the bulk crystal, a phenomenon that the index of refraction thereof is changed by an intense incident light (optical damage). The optical damage reduces a differnce in index of refraction between the optical waveguide and that of the region surrounding the optical waveguide, thereby posing a problem in that light leaks out of the optical waveguide. In recent years where it is demanded to develop optical waveguide devices compatible with intense incident lights, and since the optical damage becomes much greater as irradiating lights have higher intensities, it is desired to further reduce the optical damage.

The mechanism which produce the optical damage is qualitatively considered as described below. A sectional view of the optical waveguide region of a conventional optical waveguide device is illustrated in FIG. 1, wherein the reference numeral 1 represents a base plate made of a ferroelectric crystal, and the reference numeral 2 designates an optical waveguide formed as a region having a high index of refraction in a space including the surface of the ferroelectric crystal base plate 1. When carriers (electrons, etc.) are excited by an irradiating light from the impurity level to the conduction band in the optical waveguide 2, they are moved under the ferroelectric effect for a certain distance in the direction from $-C$ to $+C$, and then protected by the defects such as impurity and holes in the crystal base plate 1, thereby producing a spatial electric field $E_{sc}$[V/cm] between the optical waveguide 2 and the crystal base plate 1. It is said that the optical damage is produced due to the change of the index of refraction (lowering of the index of refraction) of the optical waveguide 2 which is induced by said spatial electric field. The change of index of refraction $\Delta n$ of the optical waveguide 2 is expressed as follows:

$$\Delta n = -(\tfrac{1}{2}) n^3 r E_{sc} \qquad (1)$$

wherein the reference symbols n and r represent the index of refraction and the electrooptical constant [cm/v] respectively of the crystal composing the optical waveguide 2. Further, said spatial electric field is expressed as follows (see R. A. Becker and Williamson, Appl. Phys. Lett. 47, 1042, 1985):

$$E_{sc} = \alpha K I_{ir}/(\sigma_d + \sigma_{ph}) \qquad (2)$$

wherein the reference symbols $\sigma_d$, $\sigma_{ph}$, $\alpha$ and K represent the electrical conductance [$\Omega^{-1}$, cm$^{-1}$], the photoconductivity [$\Omega^{-1}$, cm$^{-1}$], the optical absorption coefficient [cm$^{-1}$] and the glass constant [cm/v] respectively of the above-mentioned crystal. Further, the reference symbol $I_{ir}$ designates the intensity of the irradiating light [W/cm$^2$].

In order to reduce the optical damage, examinations are currently made mainly on the two methods which are described below. One method is to weaken the above-mentioned spatial electric field by increasing the photoconductivity $\sigma_{ph}$ which increses in proportion to the intensity of irradiating light $I_{ir}$, the electrical conductance $\sigma_d$ being far lower than the photoconductivity $\sigma_{ph}$ when the intensity of irradiating light $I_{ir}$ is high. Accordingly, the electrical conductance $\sigma_d$ can be omitted in the formula (2) and it is transformed as follows when the intensity of irradiating light $I_{ir}$ is high:

$$E_{sc} = \alpha K I_{ir}/\sigma_{ph} \qquad (3)$$

Hence, it is considered from the formula (3) that enhancement of the photoconductivity $\sigma_{ph}$ is effective for weakening the spatial electric field $E_{sc}$. As a method to enhance the photoconductivity $\sigma_{ph}$, there is known the Czochralski process which grows the crystal by adding approximately 5 mol % of MgO to a melt of LiNbO$_e$ and it has been reported that this method permitted increasing the photoconductivity $\sigma_{ph}$ approximately one hundred times as high as that of LiNbO$_3$ crystal to which MgO was not added (see D. A. Bryan et al, Appl. Phys. Lett. 44, 847, 1984).

The other method is based on a fact that the optical damage is originally caused by excitation of the carriers due to the light absorption mainly by impurities, and attempts to grow the crystal as pure as possible by reducing the amounts of the impurities to be contained in the crystal.

However, it has been reported that when the optical waveguide 2 is formed by diffusing Ti metal in the LiNbO$_3$ crystal to which MgO is added by the first method, the photoconductivity $\sigma_{ph}$ of the optical waveguide 2 was the same as that of the optical waveguide 2 formed by diffusing the Ti metal in the LiNbO$_3$ crystal to which MgO was not added (see R. A. Becker, SPIE Vol. 587, 12, 1985). Accordingly, the LiNbO$_3$ crystal to which MgO is added reduces the optical damage in the state of the bulk crystal, but cannot reduce the optical damage in the optical waveguide 2 which is formed by diffusing Ti metal therein. Further, the high purification of the crystal by the second method cannot be attained without improved techniques for refining of raw materials, cleaning of the growing environment, etc., and the effect of the second method cannot be expected to be obtained in the near future.

As is understood from the foregoing description, there has been found out no means as yet for significantly reducing the optical damage in the optical waveguide formed on the base plate 1 made of the ferroelectric crystal.

SUMMARY OF THE INVENTION

In view of the problems described above, it is a primary object of the present invention to provide an optical waveguide device substantially unaffected by the above-described optical damage, and a method of making the same.

The optical waveguide device according to the present invention is characterized in that it comprises a base plate made of a ferroelectric crystal, an optical waveguide formed as a region having a high index of refraction in a space including a surface portion of said base plate made of the ferroelectric crystal, and a film of a highly transmissive substance covering the surface of said optical waveguide in the direction along the C axis of said base plate made of the ferroelectric crystal and having electrical conductance higher than that of the optical waveguide.

The method of making the optical waveguide device according to the present invention is characterized in that it comprises a step of preparing an optical waveguide by forming, by thermal diffusion or chemical reaction, a region having a high index of refraction in a space including a surface portion of a base plate made of the ferroelectric crystal, and another step of covering the surface of said optical waveguide with a film made of highly transmissive substance which has electrical conductance higher than that of said optical waveguide in the direction along the C axis of said base plate made of the ferroelectric crystal. The method according to the present invention is very simple since it requires only one additional step, as compared with the conventional method, to cover the surface of the optical waveguide with a film of the substance having higher electrical conductance than the waveguide.

In the optical waveguide device according to the present invention, the surface of the optical waveguide 2 is covered, as shown in FIG. 2, with the film 3 of the substance having electrical conductance higher than that of the optical waveguide 2 by a high-frequency sputtering process or similar process, and electric charges move through the film 3 so as to cancel the spatial electric field. Accordingly, the spatial electric field formed by the irradiating light is weakened, the change of the index of refraction $\Delta n$ of the optical waveguide is reduced and the optical waveguide is less affected by optical damage.

These and other objects as well as further features and advantages of the present invention will become apparent from the following detailed description of the present invention when taken in conjunction with the accompanying drawings.

BRIEF DESCRIPTION OF THE DRAWINGS

FIG. 1 is a sectional view illustrating the optical waveguide of the conventional optical waveguide device on an enlarged scale;

FIG. 2 is a sectional view of the optical waveguide of the optical waveguide device according to the present invention on an enlarged scale;

FIG. 3 is a plan view illustrating an embodiment of the optical waveguide device according to the present invention in a condition where it is not covered by the film of the substance having high electrical conductance;

DESCRIPTION OF THE PREFERRED EMBODIMENT

Now, the present invention will be described in more detail below with reference to the preferred embodiment shown in the accompanying drawings.

Figure 4:
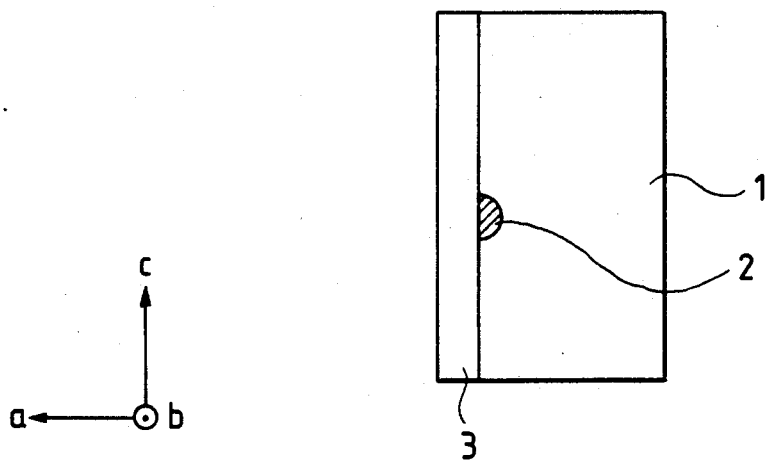
FIG. 4 is a sectional view illustrating structure of said embodiment.

The optical waveguide 2 illustrated in FIG. 3 was prepared by mirror-grinding one of the main surfaces of a base plate, made of a ferroelectric crystal such as $LiNbO_3$ crystal, 0.5 mm thick in the direction of the a axis, 40 mm long in the direction of the b axis and 10 mm wide in the direction of the c axis of the $LiNbO_3$ crystal, forming an optical waveguide pattern 2a which composes a Mach-Zehender interferometer having optical waveguide 7 $\mu m$ and wide arms 16 mm long on said main surface by the photolithographing process, further forming in the longitudinal direction an optical waveguide pattern 2b connected to only one of the arms of said optical waveguide pattern 2a, depositing Ti to thickness of approximately 80 nm on the optical waveguide patterns 2a and 2b, forming patterns of Ti by the lift-off method, and carrying out thermal diffusion for 6 hours at 1050° C. Then, the surface of the base plate 1 made of the $LiNbO_3$ crystal including a surface portion of the optical waveguide 2 was covered, as shown in FIG. 4, with a film of $SiO_2$, selected as the film 3 of the highly transmissive substance having electrical conductance higher than that of the optical waveguide 2, in the direction along the c axis of the crystal base plate 1 by the high-frequency sputtering process. The optical waveguide device thus prepared was selected as the embodiment of the present invention. Needless to say, it is possible for forming an optical waveguide to use, in place of the thermal diffusion described above, a chemical reaction which is exemplified by the proton-exchange method represented by the following chemical equation:

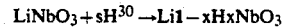
$$LiNbO_3 + sH^{30} \rightarrow Li1 - xHxNbO_3$$

On the other hand, an optical waveguide device which was not covered with the film 3 as shown in FIG. 3, i.e., an optical waveguide device which was the same as the conventional example shown in FIG. 1 was prepared for reference.

Then, performance of the embodiment of the present invention and that of the reference example were measured and compared with each other as described below. First, the optical waveguide 2 was irradiated through the port A, out of two input ports of the reference example, with a He-Ne laser beam having a wavelength of 0.633 $\mu m$ which was selected as a light for inducing optical damage and, through the port B, with an LD (laser diode) beam having a wavelength of 1.3 $\mu m$, selected as a probe beam for measuring the change of index of refraction of the optical waveguide caused by the optical damage, at an intensity level low enough not to cause the optical damage in the TE mode having electric field components in the direction parallel with the c axis of the $LiNbO_3$ crystal. When the waveguide is irradiated with the He-Ne laser beam through the port A, carriers are produced by the He-Ne laser beam in only one of the two arms of the interferometer and moved in the direction from $-C$ to $+C$ as shown in FIG. 1 under the ferroelectric effect of the crystal, whereby positive charges are increased in said arm of the optical waveguide 2 and negative charges are increased in the section located on the side of $+C$ of the crystal base plate 1 which is adjacent to the optical waveguide 2. Accordingly, the above-mentioned spatial electric field is produced and the index of refraction of said arm is changed as seen from the above-mentioned formula (1). When the optical waveguide is irradiated by the probe beam through the input port B, the probe beam produces a phase difference of $(2\pi/\lambda) \Delta n(t) L$ due to the difference in index of refraction between the two arms of the interferometer. In the above-mentioned formula of the phase difference, the reference symbol $\lambda$ represents the wavelength of the probe beam [$\mu$m], the reference symbol $\Delta n(t)$ designates the change of index of refraction determined as a function of irradiating duration time [sec] of the He-Ne laser beam and the reference symbol L denotes the arm length [mm] of the interferometer. At this time, output intensity $I(t)$ [W/cm$^2$] of the probe beam at the output port C is expressed as follows:

$$I(t) = I_0 \cos^2(\pi \Delta n(t) L)/\lambda \qquad (4)$$

wherein the reference symbol $I_0$ represents the maximum value of the output intensity of the observed probe beam in the output port C. Though both the He-Ne laser beam and the probe beam emerge simultaneously from the output port C, variation of the output intensity only of the probe beam could be measured by modulating the irradiating probe beam and detecting the output intensity of the probe beam with a lock-in amplifier. Though the formula (4) permits determining the change of the index of refraction from the output intensity $I(t)$ of the probe beam, the formula (5) described below was used for accurate evaluation of the optical damage $S\pi$ [cm$^2$/J]. Since the change from the maximum value $I_0$ of the output intensity $I(t)$ of the probe beam to the first minimum value 0 thereof corresponds to a phase difference of $\pi$ between the arms, and the change of the index of refraction at this time is a constant of $\lambda/2L$ from the formula (4), sensitivity of optical damage $S\pi$ [cm$^2$/J] is expressed by the following formula (5):

$$S\pi = (\lambda/2L) \times [1/(I_{ir} t_\lambda)] \qquad (5)$$

wherein the reference symbol $t_{90}$ [sec] represents the time required for the output intensity of the probe beam to attain from the maximum value $I_0$ to the first minimum value 0 thereof, and the reference symbol $I_{ir}$ [W/cm$^2$] designates the intensity of the irradiating He-Ne laser beam. It is a known fact that the optical damage is constant regardless of intensity of the irradiating He-Ne laser beam within a range where the intensity of the irradiating light is at low level, but abruptly increased as the intensity of the irradiating light becomes higher (see T. Fujiwara et al, Appl. Phys. Lett. 54, 975, 1989).

Figure 5:
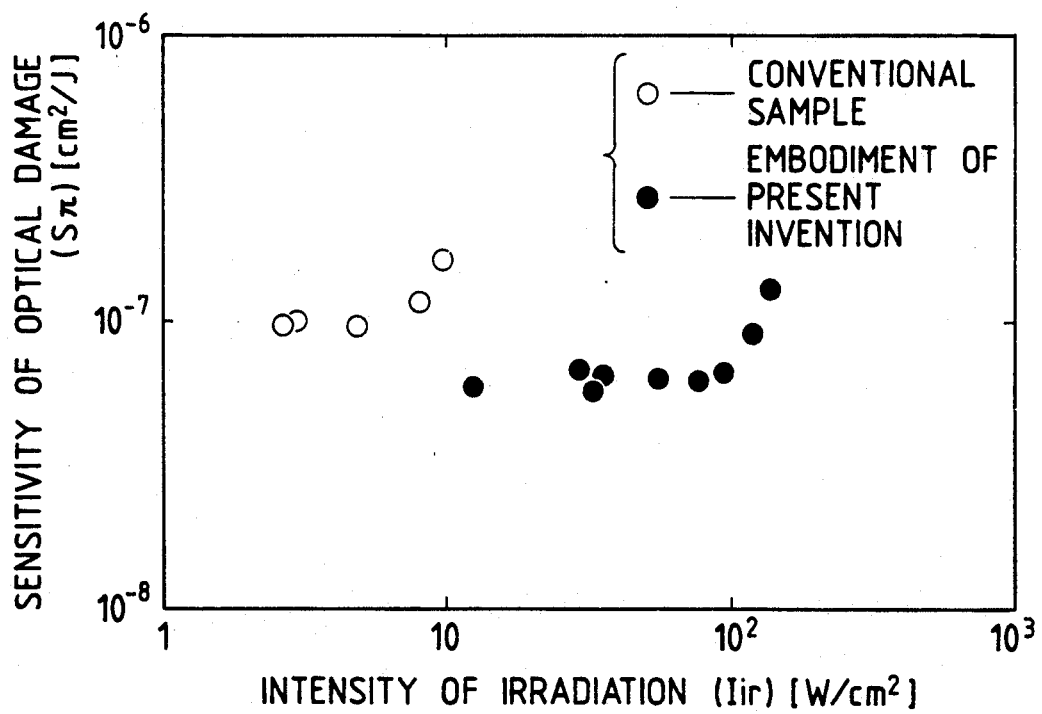
FIG. 5 is a graph illustrating relations between intensities of irradiating light and optical damage in both said embodiment of the present invention and the conventional example.

Results obtained by measuring the performance of the reference example by the method described above are indicated by white circles in FIG. 5 wherein the intensity of the irradiating He-Ne laser beam is taken as the abscissa and the optical damage determined by the formula (5) is taken as the ordinate. It will be understood from FIG. 5 that the optical damage is constant within a range where the intensity of the irradiating light is lower than 5 [W/cm$^2$], but increased abruptly when the intensity of the irradiating light exceeds 5 [W/cm$^2$]. Then, the relation between the intensity of the irradiating He-Ne laser beam and the sensitivity of optical damage in the embodiment of the present invention was checked by the same measuring method. The intensity levels of the irradiating light at which the sensitivity to irradiating was changed abruptly in the embodiment of the present invention were more than ten times as high as those in the reference example as indicated by black circles in FIG. 5. This is because the surface of the optical waveguide 2 is covered with the film 3 of the substance having electrical conductance higher than that of the optical waveguide and electric charges move through the film 3 of the covering substance in directions to cancel the spatial electric field, thereby reducing the intensity of the spatial electric field produced by the He-Ne laser beam and reducing the change of index of refraction $\Delta n$ of the optical waveguide 2.

Figure 6A:
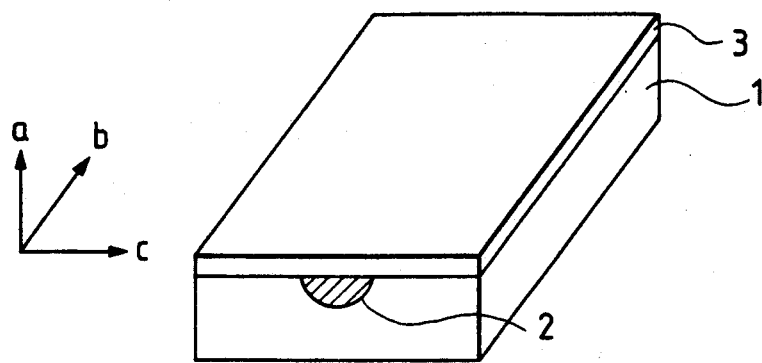
FIG. 6A, FIG. 6B and FIG. 6C are perspective views illustrating practical examples different from one another of the optical waveguide device according to the present invention.
Figure 6B:
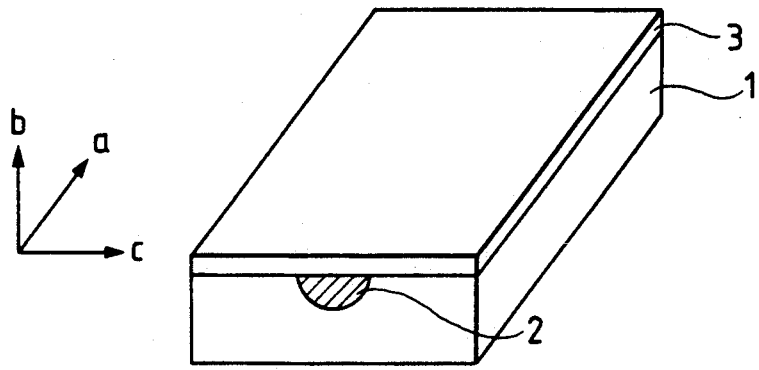
Figure 6C:
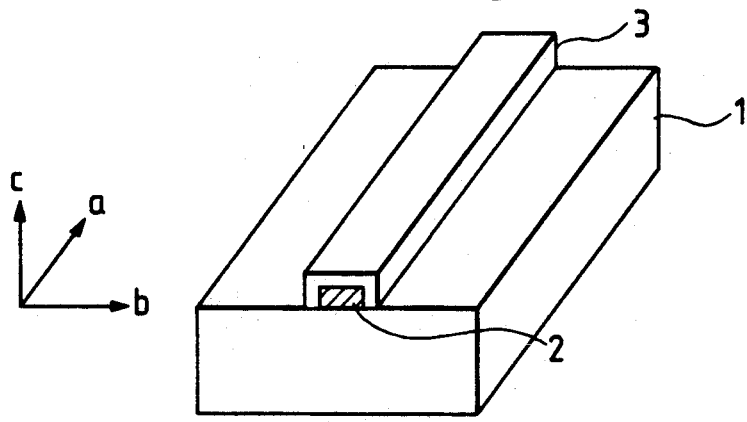

Though the film 3 having the high electrical conductance is formed on the surface of the base plate 1 as shown in FIG. 6A or FIG. 6B when the base plate 1 made of the LiNbO$_3$ crystal is thick in the direction of the a axis or the b axis of the crystal, it is necessary, in a case where the base plate 1 is thick in the direction of the c axis of the crystal, to form the so-called ridge-type optical waveguide 2 by heaping up the region of the optical waveguide as shown in FIG. 6C and covering the surface of the ridge-type optical waveguide with the film 3 of the substance having the high electrical conductance. The reason for forming the ridge-type optical waveguide is that the film 3 must be formed in the direction along the c axis and very close to the optical waveguide 2 in order to weaken the spatial electric field to be produced in the direction along the c axis.

In addition, the film 3 of the substance described above must be highly transparent for light waves since it travels through the optical waveguide 2 while oozing the electric field thereof out of the substance of the optical waveguide 2. Accordingly, it is necessary for the optical waveguide device according to the present invention to select a substance, for example SiO$_2$ or In$_x$Sn$_{1-x}$O$_2$, which has electrical conductance higher than that of the crystal base plate 1 and high transmittance for light waves to travel through the optical waveguide device. Experiments indicated that an optical waveguide covered with a film of In$_x$Sn$_{1-x}$O$_2$ exhibits the same effect as that of the embodiment of the present invention described above.

What is claimed is:

1. An optical waveguide device comprising a base plate made of a ferroelectric crystal having a, b and c crystallographic axes, an optical waveguide having a high index of refraction and formed on a portion of the base plate from the surface thereof to a predetermined depth, said waveguide having a transmission direction along the a or b axis of said base plate, and a film covering the surface of said optical waveguide in the direction along the c axis of said crystal base plate and made of a highly transmissive substance having electrical conductance higher than that of said optical waveguide.

2. An optical waveguide device comprising an optical waveguide having a high index of refraction and formed to a predetermined height on a surface portion of a surface of a base plate made of a ferroelectric crystal, and a film covering the surface of said optical waveguide in the direction along the c axis of said crystal base plate and made of a highly transmissive substance having electrical conductance higher than that of said optical waveguide.

3. An optical waveguide device according to claim 1 or 2 wherein said base plate made of the ferroelectric crystal is a base plate made of LiNbO$_3$ crystal, said optical waveguide is made of either Ti or H+ and said film is made of $SiO_2$.

4. An optical waveguide device according to claim 1 or 2 wherein said base plate made of the ferroelectric crystal is a base plate made of $LiNbO_3$ crystal, said optical waveguide is made of either Ti or H+ and said film is made of $In_xSn_{1-x}O_2$.

5. A method of making an optical waveguide device comprising the steps of:

forming by thermal diffusion, a region having a high index of refraction in a space including a surface portion of a base plate made of a ferroelectric crystal having a, b and c crystallographic axes for constituting an optical waveguide having a transmission direction along the a or b axis of said base plate; and covering the surface of said optical waveguide in the direction along the c axis of said crystal base plate with a film made of a highly transmissive substance having electrical conductance higher than that of said optical waveguide region.

6. A method of making an optical waveguide device comprising the steps of:

forming by a chemical reaction, a region having a high index of refraction in a space including a surface portion of a base plate made of a ferroelectric crystal having a, b and c crystallographic axes for constituting an optical waveguide having a transmission direction along the a or b axis of said base plate; and covering the surface of said optical waveguide in the direction along the c axis of said crystal base plate with a film made of a highly transmissive substance having electrical conductance higher than that of said optical waveguide region.

7. A method of making an optical waveguide device according to claim 5 or 6 wherein said base plate made of ferroelectric crystal is a base plate made of $LiNbO_3$ crystal, said optical waveguide region is composed of either Ti or H+ and said film is made of $SiO_2$.

8. A method of making an optical waveguide device according to claim 5 or 6 wherein said base plate made of ferroelectric crystal is a base plate made of $LiNbO_3$ crystal, said optical waveguide region is composed of either Ti or H+ and said film is made of $In_xSn_{1-x}O_2$.

* * * * *